US010929592B2

(12) United States Patent
Asente

(10) Patent No.: US 10,929,592 B2
(45) Date of Patent: Feb. 23, 2021

(54) LAYOUT OF DESIGN ELEMENTS IN ELECTRONIC DOCUMENTS

(71) Applicant: Adobe Inc., San Jose, CA (US)

(72) Inventor: Paul John Asente, Redwood City, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/369,619

(22) Filed: Mar. 29, 2019

(65) Prior Publication Data

US 2020/0311184 A1 Oct. 1, 2020

(51) Int. Cl.
*G06F 40/103* (2020.01)
(52) U.S. Cl.
CPC .................................. *G06F 40/103* (2020.01)
(58) Field of Classification Search
CPC ...................................................... G06F 40/103
See application file for complete search history.

(56) References Cited

U.S. PATENT DOCUMENTS

| 2005/0071783 | A1* | 3/2005 | Atkins | G06T 11/60 715/851 |
| 2006/0200758 | A1* | 9/2006 | Atkins | G06T 11/60 715/209 |
| 2012/0042240 | A1* | 2/2012 | Oliveira | G06F 40/106 715/243 |
| 2012/0278696 | A1* | 11/2012 | Carper | G06F 40/177 715/234 |
| 2018/0203826 | A1* | 7/2018 | Ansel | G06F 40/117 |
| 2019/0206105 | A1* | 7/2019 | Martin | G06K 9/6215 |

OTHER PUBLICATIONS

Atkins, Brian C. "Adaptive photo collection page layout." In 2004 International Conference on Image Processing, 2004. ICIP'04., vol. 5, pp. 2897-2900. IEEE, 2004. (Year: 2004).*
O'Donovan et al., "Learning Layouts for Single-Page Graphic Designs", IEEE Transactions on Visualization and Computer Graphics(TVCG), Aug. 2014, vol. 20, pp. 1200-1213.
O'Donovan et al.,"DesignScape: Design with Interactive Layout Suggestions", In Proceedings of the 33rd Annual ACM Conference on Human Factors in Computing Systems (CHI '15), ACM, 2015, pp. 1221-1224.
O'Donovan et al., "DesignScape: Design with Interactive Layout Suggestions", downloaded from http://www.dgp.toronto.edu/~donovan/design/index.html, URL: received Feb. 14, 2019, 1 page.

* cited by examiner

*Primary Examiner* — Frank D Mills
(74) *Attorney, Agent, or Firm* — Finch & Maloney PLLC

(57) ABSTRACT

A design layout recommendation system is disclosed that evaluates layouts of design elements generated based on aspect ratios and relative areas. In an embodiment, the system enumerates possible arrangements of the design elements into columns or rows based on a layout preference. The system can then construct layouts of the design elements for each enumerated arrangement of the design elements based on relative areas of the design elements. The layouts of the design elements are in column-oriented reading order or row-oriented reading order based on the layout preference. The system can then recommend at least one layout of the design elements based on selection criteria.

20 Claims, 11 Drawing Sheets

```
DesignFileNameA
{
        "elements": [
                {
                        "name": "A",
                        "ratioList": [1.9, 5.6],
                        "relativeArea": 0.6
                },
                {
                        "name": "B",
                        "ratioList": [0.35],
                        "relativeArea": 1.0
                },
                {
                        "name": "C",
                        "ratioList": [1.3],
                        "relativeArea": 0.67
                },
                {
                        "name": "D",
                        "minRatio": 1.8,
                        "maxRatio": 20.0,
                        "relativeArea": 0.75
                },
                {
                        "name": "E",
                        "ratioList": [3.7],
                        "relativeArea": 0.25
                }
        ]
}
```

FIG. 4

```
{
        "elements": "DesignFileNameA",
        "width": 300,
        "height": 250,
        "layout": "row",
        "allowedAreaTolerance": 0.2,
        "leftBorder": 15,
        "rightBorder": 15,
        "topBorder": 30,
        "bottomBorder": 0,
        "horizontalSpacing": 10,
        "verticalSpacing": 15
}
```

(Iteration 1)

(Iteration 4)

(Iteration 2)

(Iteration 5)

(Iteration 3)

(Iteration 6)

LAYOUT OF DESIGN ELEMENTS IN ELECTRONIC DOCUMENTS

FIELD OF THE DISCLOSURE

This disclosure relates generally to design layouts, and more particularly, to reading order layout of design elements included in an electronic document, based on aspect ratios and relative sizes.

BACKGROUND

Designers oftentimes create design layouts by arranging visual elements on an electronic document. For example, a designer might create a layout when electronically designing a banner advertisement, a pamphlet, a brochure, a card, a poster, a mobile application, a web page, or other electronic document. To do so, the designer may position various visual elements, such as images and/or text, on an electronic document, or design canvas, to create a visually pleasing design.

Various software-based design applications are available for use in generating design layouts. Many of these design applications are template based. That is, such applications provide pre-defined fixed templates to assist users in creating design layouts. A user can then create a design layout by placing content in the various fixed placeholders defined by the template. While these template-based design applications may provide some flexibility to change colors and fonts, they are rigid with respect to specific location and/or size of a given element fixed within the layout of the template. For instance, the templates may only provide limited or standard-size placeholders, and such placeholders may not be reflective of the context of a new design layout that is being created or are other otherwise not suitable. Thus, not only do standard design applications require considerable effort on the part of users, using such design applications may be time consuming and ultimately ineffective at providing a suitable design.

BRIEF DESCRIPTION OF THE DRAWINGS

FIG. 4 shows an example description of a set of design elements in a design-elements specification file, in accordance with an embodiment of the present disclosure.

FIG. 6 shows an example layout specification file, in accordance with an embodiment of the present disclosure.

These and other features of the present embodiments will be understood better by reading the following detailed description, taken together with the figures herein described.

DETAILED DESCRIPTION

Techniques are disclosed for facilitating coordinated generation of design layouts based on relatively simple user-provided descriptions of design elements and a desired layout. According to an embodiment, a design layout application is programmed or otherwise configured to generate layouts of design elements on a digital canvas (sometimes referred to herein more simply as a "canvas") based on a design-elements specification and a layout specification. The design-elements specification includes descriptions of the design elements to include in the layout. The layout specification includes a description of the desired layout. In one such embodiment, the application lays out the design elements in column-oriented reading order or row-oriented reading order without regard to the actual contents of the design elements. In any such cases, the design elements are laid out in a non-overlapping manner. Further, in laying out the design elements, the design layout application treats each design element as a box (rectangle or square, as the case may be) with a constraint on its aspect ratio and relative area. Possible aspect ratios and relative areas are designated in the design-elements specification, and are provided by the user. Note that the user can provide such aspect ratios and relative areas with relative ease, based on a general layout envisioned by the user. In such embodiments, the design layout application lays out the design elements in various possible column or row distribution, evaluates the results of each distribution to identify possible design layouts to recommend, and then recommends one or more design layouts from the identified design layouts. Thus, a user can provide relatively simple descriptions of the design elements and desired layout to effectuate generation and evaluation of all possible distributions (e.g., using a particular alignment, subject to a set of user-specifications, a defined sequence or reading order of design-elements, or some combination thereof) of the design elements in a coordinated manner.

Figure 1A:
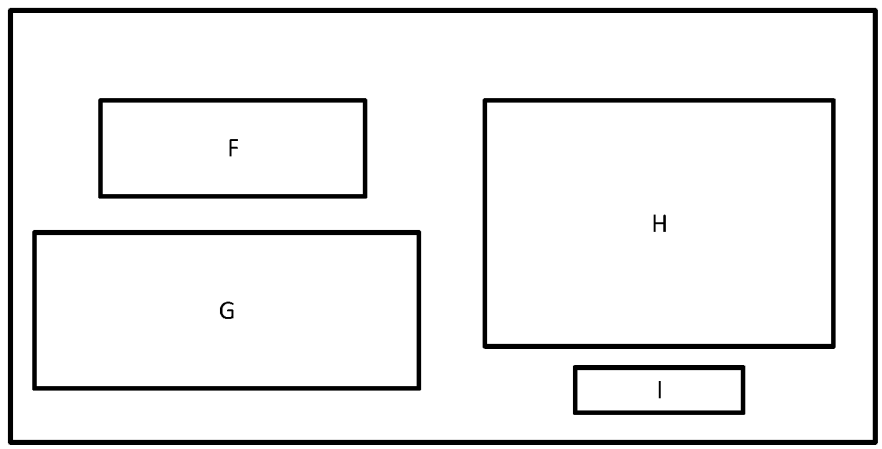
FIGS. 1A-1C each illustrates an example arrangement of design elements F, G, H, and I, wherein the reading order of the design elements is column-oriented, in accordance with an embodiment of the present disclosure.
Figure 1B:
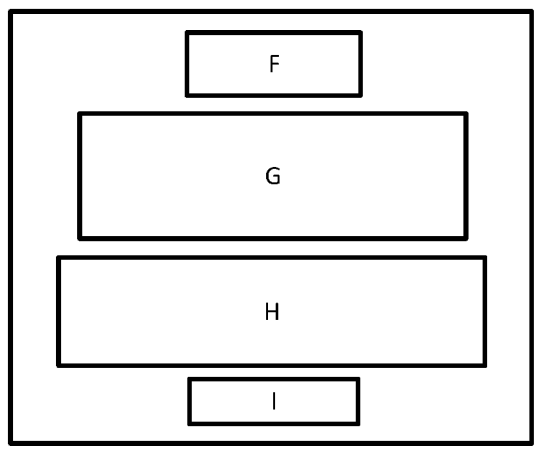
Figure 1C:
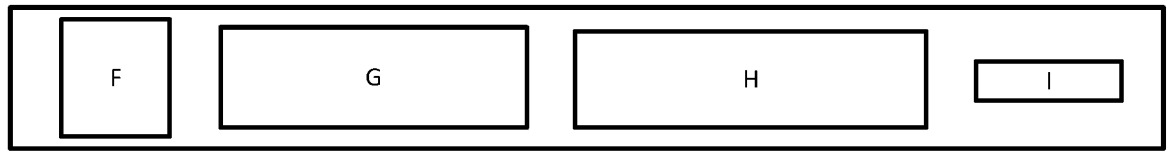
Figure 2B:
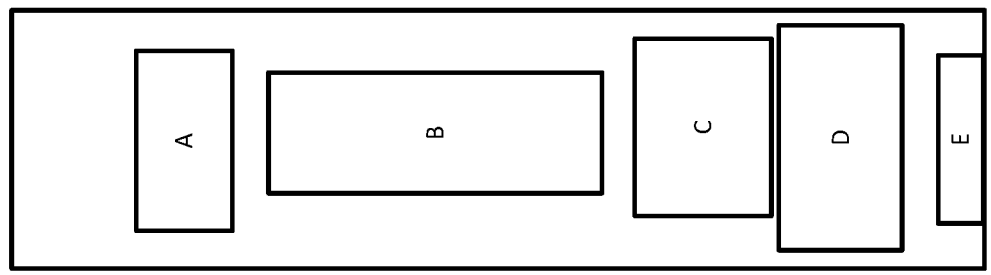
FIGS. 2A and 2B each illustrates an example arrangement of elements A, B, C, D, and E, wherein the reading order of the design elements is row-oriented, in accordance with an embodiment of the present disclosure.
Figure 2A:
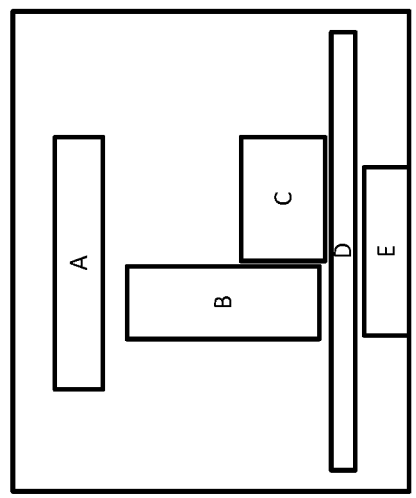

In more detail, and according to one such embodiment, a design layout application receives or otherwise is provided the specifications for the design elements and a layout, and generates a design layout based on the descriptions of the design elements and the specified layout. In one embodiment, each design element described in the design-elements specification is defined by a name, a width-to-height aspect ratio (or a range or list of such aspect ratios), and a relative area, and the layout specification includes a size of the layout, margins of the layout, spacing between the design elements, and column arrangement or row arrangement layout preference. As will be appreciated, these specifications are user-provided and can be specified with relative ease. Specifically, the number of design boxes to be included in the layout, along with the width-to-height aspect ratio and the relative area of each box, are all quite intuitive to a user. In one such embodiment, the design layout application lays out the design elements on a canvas in either column-oriented reading order or row-oriented reading order as specified by the layout preference in the layout specification. Reading order refers to an order that proceeds from left-to right and top-to-bottom. Thus, column-oriented reading order refers to an order that proceeds from left-to-right and top-to-bottom within each column, starting from the left-most column and proceeding left-to-right. FIGS. 1A-1C each illustrates an example arrangement of design elements F, G, H, and I, wherein the reading order of the design elements is column-oriented, in accordance with an embodiment of the present disclosure. As shown in FIG. 1A, design elements F, G, H, and I are arranged in two columns and in a column-oriented reading order that proceeds from F to G in the leftmost column and then to H and to I in the rightmost column. As shown in FIG. 1B, design elements F, G, H, and I are arranged in a single column and in a column-oriented reading order that proceeds from top-to-bottom in the order F, G, H, and I. As shown in FIG. 1C, design elements F, G, H, and I are arranged in four columns and in a column-oriented reading order that proceeds from F in the leftmost column, to G in the next column to the right, to H in the next column to the right, and to I in the rightmost column. Row-oriented reading order refers to an order that proceeds from left-to-right and top-to-bottom within each row, starting from the topmost row and proceeding top-to-bottom. FIGS. 2A and 2B each illustrates an example arrangement of elements A, B, C, D, and E, wherein the reading order of the design elements is column-oriented, in accordance with an embodiment of the present disclosure. As shown in FIG. 2A, design elements A, B, C, D, and E are arranged in four rows and in a row-oriented reading order that proceeds from A in the top row, to B and then to C in the next row down, to D in the next row down, and to E in the bottom row. As shown in FIG. 2B, design elements A, B, C, D, and E are arranged in five rows and in a row-oriented reading order that proceeds from A in the top row, to B in the next row down, to C in the next row down, to D in the next row down, and to E in the bottom row.

In some such embodiments, the design layout application enumerates all possible distributions (e.g., using a particular alignment, subject to a set of user-specifications, a defined sequence or reading order of design-elements, or some combination thereof) of the specified design elements into columns (or rows) as specified by the layout preference in the layout specification. For each enumerated arrangement, the design layout application constructs the best layout of the design elements for that particular arrangement. In one such embodiment, the design layout application initially divides the canvas into equal-width columns (or equal-height rows) and, in each column (or row), lays out the design elements such that the design elements are center-aligned in each column (or row). Note that such center-alignment is not required in all embodiments. For instance, in other embodiments, the design elements in each column can be laid-out to be aligned with the left margin of the column, the right margin of the column, half way between the center and the left margin of the column, half way between the center and the right margin of the column, a pre-established distance from the center to the left margin of the column, a pre-established distance from the center to the right margin of the column, or any combination thereof. Similarly, the design elements in each row can be laid-out to be aligned with the top margin of the row, the bottom margin of the row, half way between the center and the top margin of the row, half way between the center and the bottom margin of the row, a pre-established distance from the center to the top margin of the row, a pre-established distance from the center to the bottom margin of the row, or any combination thereof. In any such cases, the design layout application lays out the design elements in each column (row) in the best manner possible in accordance with the aspect ratios and the relative areas specified for the design elements. The design layout application then checks the relative areas of all the design elements across the columns (or rows) to determine whether each design element is within its specified relative area. In some such embodiments, the design layout application can check to determine whether each design element is within an applicable relative area tolerance.

In any case, if all the design elements have relative areas within specification (e.g., within the respective relative area or area tolerance), the design layout application can conclude that the current layout of design elements is the best possible layout (e.g., based on established criteria) for the arrangement and proceed to the next enumerated arrangement. Otherwise, the design layout application adjusts the widths of the columns (or heights of the rows) and, in each column (or row), lays out the design elements in the best manner possible in accordance with the aspect ratios and the relative areas specified for the design elements in each adjusted column (or row). In one implementation, the design layout application can reduce the widths of the columns (or heights of the rows) having a design element whose relative area is not within specification because the design element is too large. Note that, assuming no change to the size of the canvas, reducing the width of a column (or height of a row) effectively results in an increase in the width of one or more other columns (or height of one or more other rows).

As noted above, the design layout application according to some embodiments evaluates the layouts of the design elements based on some selection criteria. As will be appreciated in light of this disclosure, the selection criteria can be objective and/or subjective. In some example cases, the selection criteria may be specified by a user. Examples of selection criteria include a preference for layouts having the least amount of unused space, a preference for layouts having the highest number of design elements that are within a given tolerance of or otherwise sufficiently close (e.g., within 20% of a target aspect ratio, or within 10%, or within 5%, or within 2%) to a specified aspect ratio or within a range of target aspect ratios, such as within an aspect ratio window of 1:2 to 1:3, 1:3 to 1:5, 1:4 to 1:6, or any other desired range of window of target aspect ratios. In addition, or alternatively, a preference can be given for layouts having design elements that are not too square, not too tall, and/or not too wide. Likewise, a preference can be given to layouts having design elements that have a desired shape. Additionally, or alternatively, the design layout application may determine the selection criteria based on factors such as the relative areas of the design elements, the relative sizes of the design elements, and the relative sizes of the columns (or rows), to name a few examples. As will be appreciated in light of this disclosure, any number of other desired preferences can be designated. In any case, the design layout application recommends or otherwise presents one or more layouts of the design elements based on the evaluation.

As will be further appreciated, the techniques disclosed herein can be used to provide design element layouts having a column-oriented reading order or a row-oriented reading order. To this end, phrases such as "column [or row]" or more simply "column [row]" as used herein are intended to indicate that the stated technique can be applied in either a column-oriented fashion or a row-oriented fashion. So, for instance, row can be substituted for column, vice-versa. Furthermore, the column or rows can have any desired alignment, whether it be center-aligned, left-aligned, right-aligned, top-aligned, bottom-aligned, or some other desired alignment of design elements with a column or row orientation.

The disclosed techniques provide numerous advantages over previous techniques for generating design layouts. For example, and according to an embodiment, the techniques employ a design-elements specification that describes the design elements using aspect ratios and relative areas. Thus, unlike the templates that restrict the design elements to rigid pre-defined sizes of the placeholders, a design layout application according to an embodiment of the present disclosure generates and evaluates layouts of the design elements based on aspect ratios and relative areas and thus, does not restrict the design elements to rigid pre-defined sizes. In addition, the disclosed techniques, according to some embodiments, do not require large numbers of user operations, such as repeated user operations of resizing and/or repositioning design elements relative to other design elements, to generate an acceptable design layout. Rather, a design layout application configured in accordance with an embodiment of the present disclosure utilizes a design-elements specification file that includes relatively simple descriptions of all the design elements to be laid out. This allows for efficiently modifying design elements in a coordinated manner to accommodate a particular change or modification to a design element (or design elements) in the other design elements when generating the various layouts of the design elements. This is in contrast to and a technical advantage over the prior techniques that require iterative user operations to accommodate a particular change to a design element in the other design elements. These and other advantages and alternative embodiments will be apparent in light of this disclosure.

System Architecture

Figure 3:
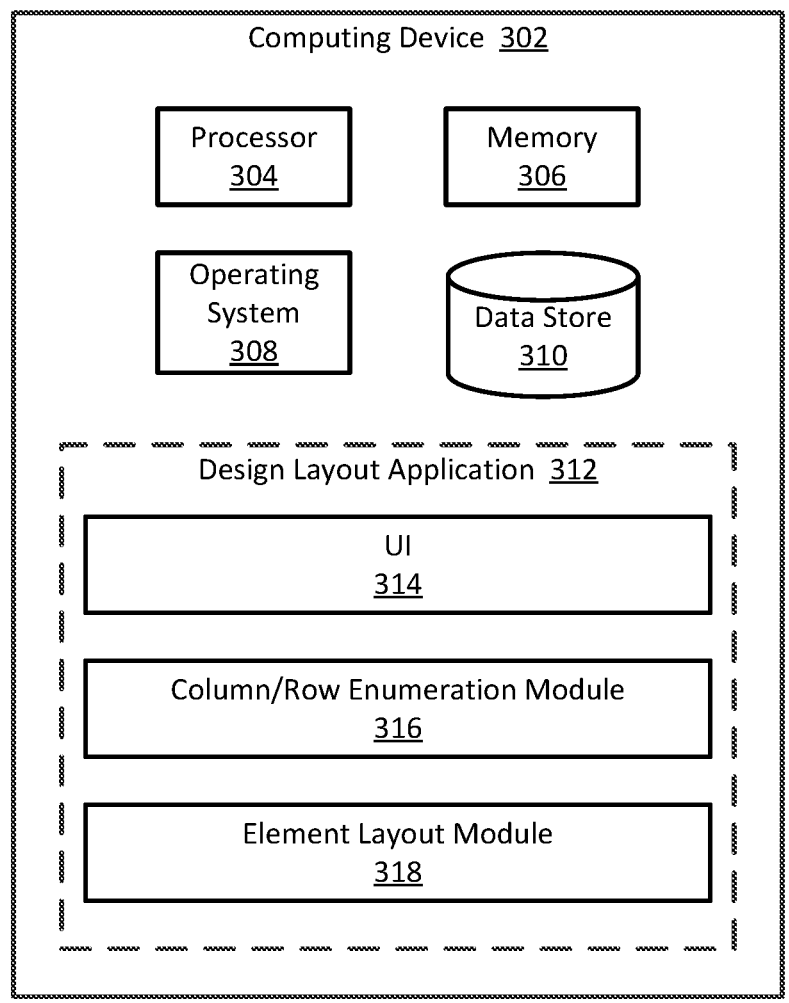
FIG. 3 is a block diagram illustrating selected components of an example computing system that is programmed with or otherwise includes a design layout application, in accordance with an embodiment of the present disclosure.

FIG. 3 is a block diagram illustrating selected components of an example computing system 302 that is programmed with or otherwise includes a design layout application, in accordance with an embodiment of the present disclosure. In some embodiments, computing system 302 is a computer system, such as a workstation, desktop computer, server, laptop, handheld computer, tablet computer (e.g., the iPad tablet computer), mobile computer or communication device (e.g., the iPhone mobile communication device, the Android mobile communication device, and the like), or other form of computing or telecommunication device that is capable of communication and that has sufficient processing power and memory capacity to perform the operations described in this disclosure. In some embodiments, a distributed computational system is provided comprising multiple of such computing devices. As shown in FIG. 3, computing system 302 includes a processor 304, a memory 306, an operating system 308, a data store 310, and a design layout application 312. In various embodiments, additional components (not illustrated, such as a display, communication interface, input/output interface, etc.) or a subset of the illustrated components can be employed without deviating from the scope of the present disclosure. For instance, in various embodiments, design layout application 312 may not include one or more of the components illustrated in FIG. 3, but design layout application 312 may connect or otherwise couple to the one or more components via a communication interface.

Processor 304 may be designed to control the operations of the various other components of computing system 302. Processor 304 may include any processing unit suitable for use in computing system 302, such as a single core or multi-core processor. In general, processor 304 may include any suitable special-purpose or general-purpose computer, computing entity, or computing or processing device including various computer hardware, or firmware, and may be configured to execute instructions, such as program instructions, stored on any applicable computer-readable storage media. For example, processor 304 may include a microprocessor, a central processing unit (CPU), a microcontroller, a digital signal processor (DSP), an application-specific integrated circuit (ASIC), a Field-Programmable Gate Array (FPGA), Complex Instruction Set Computer (CISC), Reduced Instruction Set Computer (RISC), multi core, or any other digital or analog circuitry configured to interpret and/or to execute program instructions and/or to process data, whether loaded from memory or implemented directly in hardware. Although illustrated as a single processor in FIG. 3, processor 304 may include any number of processors and/or processor cores configured to, individually or collectively, perform or direct performance of any number of operations described in the present disclosure.

Memory 306 may include computer-readable storage media configured for carrying or having computer-executable instructions or data structures stored thereon. Such computer-readable storage media may include any available media that may be accessed by a general-purpose or special-purpose computer, such as processor 304. By way of example, and not limitation, such computer-readable storage media may include non-transitory computer-readable storage media including Random Access Memory (RAM), Dynamic Random Access Memory (DRAM), Synchronized Dynamic Random Access Memory (SDRAM), Static Random Access Memory (SRAM), non-volatile memory (NVM), or any other suitable storage medium which may be used to carry or store particular program code in the form of computer-executable instructions or data structures and which may be accessed by a general-purpose or special-purpose computer. Combinations of the above may also be included within the scope of computer-readable storage media.

Operating system 308 may comprise any suitable operating system, such as UNIX®, LINUX®, MICROSOFT® WINDOWS® (Microsoft Crop., Redmond, Wash.), GOOGLE® ANDROID™ (Google Inc., Mountain View, Calif.), APPLE® iOS (Apple Inc., Cupertino, Calif.), or APPLE® OS X° (Apple Inc., Cupertino, Calif.). As will be appreciated in light of this disclosure, the techniques provided herein can be implemented without regard to the particular operating system provided in conjunction with computing system 302, and therefore may also be implemented using any suitable existing or subsequently developed platform.

Data store 310 may include any type of computer-readable storage media configured for short-term or long-term storage of data. By way of example, and not limitation, such computer-readable storage media may include a hard drive, solid-state drive, Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), non-volatile memory (NVM), or any other storage medium, including those provided above in conjunction with memory 306, which may be used to carry or store particular program code in the form of computer-readable and computer-executable instructions, software or data structures for implementing the various embodiments as disclosed herein and which may be accessed by a general-purpose or special-purpose computer. Combinations of the above may also be included within the scope of computer-readable storage media. Data store 310 may be provided on computing system 302 or provided separately or remotely from computing system 302.

As further shown in FIG. 3, design layout application 312 includes a user interface (UI) 314, a column/row enumeration module 316, and an element layout module 318. UI 314 is configured to provide a graphical user interface, or other suitable user interface such as a command-line interface, that allows a user, such as a layout designer, to interact with design layout application 312. For example, the user may use UI 314 to provide input data (e.g., a design-elements specification file and a layout specification file, or edits to same) to design layout application 312 to generate a desired layout of the design elements specified in the design-elements specification file on a digital canvas in accordance with the layout constraints as specified in the layout specification file. In some such embodiments, UI 314 may be integrated into design layout application 312, or vice-versa. As described in further detail with respect to FIGS. 4-11, design layout application 312 is generally configured to facilitate the generation of a design layout. Briefly, in overview, column/row enumeration module 316 is configured to enumerate all possible distributions (e.g., using a particular alignment, subject to a set of user-specifications, a defined sequence or reading order of design-elements, or some combination thereof) of design elements into columns (rows). Element layout module 318 is configured to construct the best design layout for each enumerated column (row) arrangement.

In various embodiments, additional components or a subset of the illustrated components can be employed without deviating from the scope of the present disclosure. For instance, other embodiments may integrate the various functionalities of design layout application 312, including UI 314, column/row enumeration module 316, and element layout module 318 into fewer modules (e.g., one or two) or more modules (e.g., four, five or six, or more). In addition, further note that the various components of design layout application 312 may be distributed across additional machines. In some cases, one or more of UI 314, column/row enumeration module 316, and element layout module 318 may be downloaded from a server computing system onto computing system 302 for local execution. In some cases, the functionality provided by one or more of UI 314, column/row enumeration module 316, and element layout module 318 may be provided on a server computing system communicatively coupled to computing system 302. In a more general sense, the degree of integration and distribution of the functional component(s) provided herein can vary greatly from one embodiment to the next, as will be appreciated in light of this disclosure.

Inputs

As discussed above, one input to design layout application 312 is a design-elements specification, which includes descriptions of the design elements to include in the layout. In an embodiment, each design element is described by a name, an aspect ratio, and a relative area. The name of a design element uniquely identifies the design element. In some example cases, the name may be a text string. The aspect ratio of a design element defines the proportional relationship between the width and the height of the design element. For example, an aspect ratio value of 3 for a design element means that the design element is 3 times as wide as it is tall, and an aspect ratio value of 0.5 means that the design element is half as wide as it is tall. The relative area of a design element defines an area of the design element with respect to the areas of the other design elements. For example, a design element having a relative area value of 0.5 is twice as large in area as another design element having a relative area value of 0.25. In one example embodiment and as will be further described below, the relative area values are approximate values, and the design elements can have an actual area that is within some specified tolerance of the specified relative area values. As previously described, in laying out the design elements, the design layout application 312 treats each design element as a rectangle.

In some embodiments, the aspect ratio for a design element can be specified as a fixed aspect ratio value, a list of allowable aspect ratio values, or a variable range of aspect ratio values. An aspect ratio specified as a fixed aspect ratio value means that the corresponding design element is to have an aspect ratio that is always the specified value. An aspect ratio specified as a list of allowable aspect ratio values means that the corresponding design element is to have an aspect ratio that is one of the specified values. An aspect ratio specified as a variable range of aspect ratio values means that the corresponding design element is to have an aspect ratio that is any value in the specified range of values.

Figure 5:
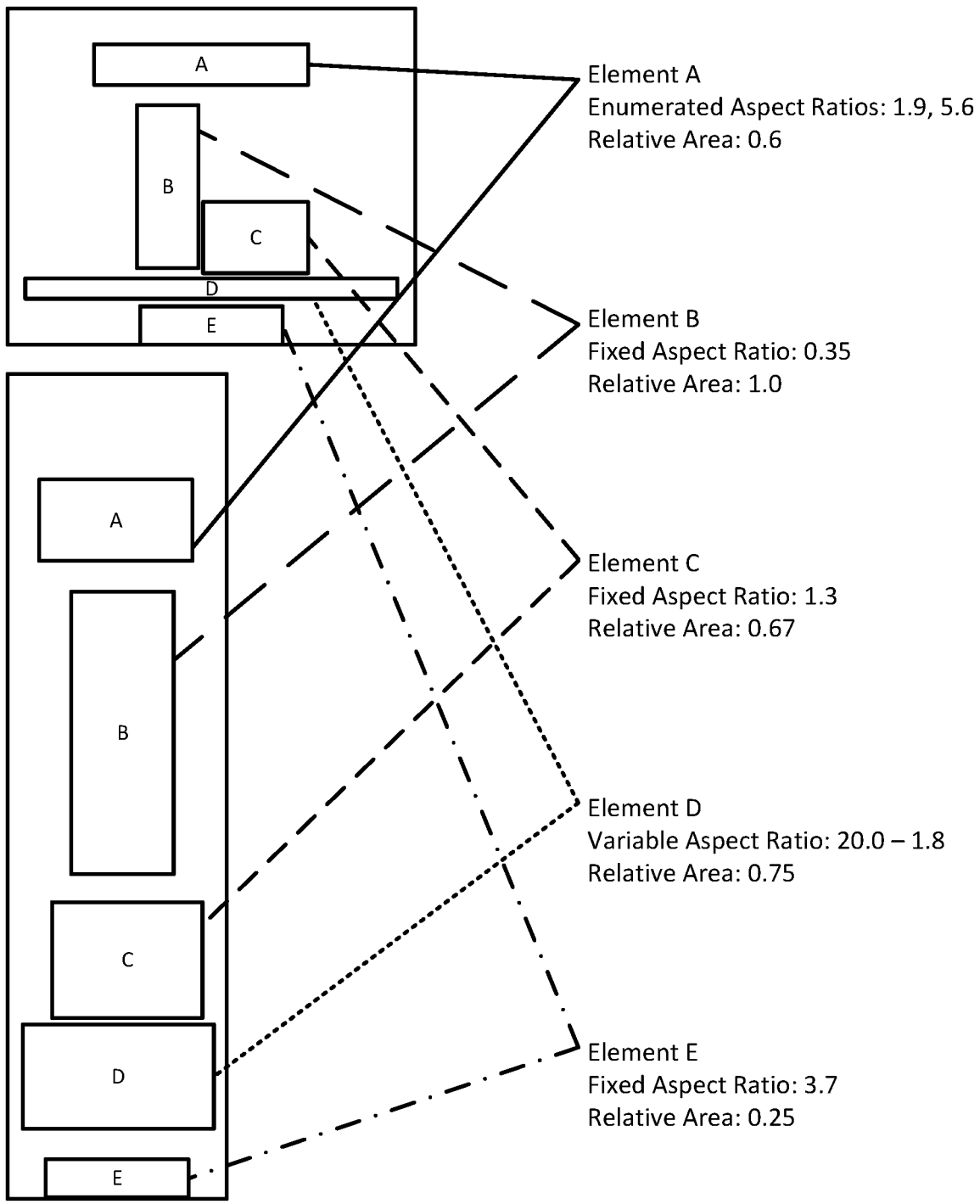
FIG. 5 is a diagram showing example layouts of the set of design elements in accordance with the example description in FIG. 4, in accordance with an embodiment of the present disclosure.

FIG. 4 shows an example description of a set of design elements in a design-elements specification file, in accordance with an embodiment of the present disclosure. In particular, the description in FIG. 4 is of the design elements A, B, C, D, and E shown in FIGS. 2A and 2B. FIG. 5 is a diagram showing example layouts of the set of design elements in accordance with the example description in FIG. 4, in accordance with an embodiment of the present disclosure. In particular, the top layout in FIG. 5 is the arrangement of design elements A, B, C, D, and E shown in FIG. 2A, and the bottom layout in FIG. 5 is the arrangement of design elements A, B, C, D, and E shown in FIG. 2B. Concurrent reference to FIGS. 4 and 5 will facilitate explanation.

As shown in FIG. 4, the design-elements specification file may be uniquely identified by the name "DesignFileNameA". In the example shown in FIG. 4, the design-elements specification "DesignFileNameA" describes five design elements identified by the names A, B, C, D, and E. In some such embodiments, the order in which the design elements are described in the design-elements specification file defines the reading order of the design elements. In this example case, the reading order of the design elements is the sequence A, B, C, D, and E. As can be further seen in FIG. 4, each design element is described using the parameters "name", "ratioList" or the pair "minRatio" and "maxRatio", and "relativeArea". The parameter "name" specifies the name of a design element. The parameter "ratioList", when specified, specifies a fixed aspect ratio or a list of allowable aspect ratios for a design element. Alternatively, the pair of parameters "minRatio" and "maxRatio", when specified, specifies a variable range of aspect ratios for a design element. The parameter "relativeArea" specifies an area of the design element with respect to the areas of the other design elements.

As can be seen in FIG. 4, the five design elements are respectfully named A, B, C, D, and E. Design element A can have an aspect ratio of 1.9 or 5.6 and a relative area of 0.6. The top layout in FIG. 5 shows design element A having the aspect ratio of 5.6 and an approximate relative area of 0.6 with respect to the areas of the other design elements in the layout. The bottom layout in FIG. 5 shows design element A having the aspect ratio of 1.9 and an approximate relative area of 0.6 in relation to the other design elements in the layout. Design element B can have an aspect ratio of 0.35 and a relative area of 1.0. Both the top and bottom layouts in FIG. 5 show design element B having the aspect ratio 0.35 and an approximate relative area of 1.0 with respect to the areas of the other design elements in the respective layouts. Design element C can have an aspect ratio of 1.3 and a relative area of 0.67. Both the top and bottom layouts in FIG. 5 show design element C having the aspect ratio 1.3 and an approximate relative area of 0.67 with respect to the areas of the other design elements in the respective layouts. Design element D can have an aspect ratio that is within the range 1.8 to 20.0 and a relative area of 0.75. The top layout in FIG. 5 shows design element D having the aspect ratio of 18.5 and an approximate relative area of 0.75 with respect to the areas of the other design elements in the layout. The bottom layout in FIG. 5 shows design element D having the aspect ratio of 1.8 and an approximate relative area of 0.75 in relation to the other design elements in the layout. Design element E can have an aspect ratio of 3.7 and a relative area of 0.25. Both the top and bottom layouts in FIG. 5 show design element E having the aspect ratio 3.7 and an approximate relative area of 0.25 with respect to the areas of the other design elements in the respective layouts.

As discussed above, another input to design layout application 312 is a layout specification, which includes a description of the desired layout. In an embodiment, the layout specification specifies the constraints for the layout such as a size of the layout, margins of the layout, spacing between the design elements, and column arrangement or row arrangement layout preference. FIG. 6 shows an example layout specification file, in accordance with an embodiment of the present disclosure. For example, the description in FIG. 6 may be of a desired layout for the design elements A, B, C, D, and E shown in FIGS. 2A and 2B.

As shown in FIG. 6, the desired layout is described using the parameters "elements", "width", "height", "layout", "allowedAreaTolerance", "leftBorder", "rightBorder", "topBorder", "bottomB order", "horizontal Spacing", and "vertical Spacing". The parameter "elements" specifies the name of a design-elements specification file that includes descriptions of the design elements to include in the layout. The parameters "width" and "height" specify the width and height of a canvas on which the design elements are to be laid out. For example, the values for the width and height can be in units of pixels. In some embodiments, the specified width and height values can define a standard-size canvas. By way of one example, the specified width and height values may define one of the numerous standard sizes for a banner advertisement. In other embodiments, the specified width and height values can define a canvas that is of a non-standard size. For example, the specified width and height values may define a canvas that is of a size that allows the canvas to be included within a larger standard-size layout template. This allows for splitting or otherwise segmenting the standard size layout template into multiple sections, one or more of which can be defined and laid out in row-oriented reading order or column-oriented reading order in accordance with an embodiment of the techniques disclosed herein. Such flexibility is particularly useful to designers in layout applications where there are a high number of non-standard sizes (such as packaging for snack foods, to name one specific example). In a general sense, the width and height parameters can be used to specify a canvas of any desired size including standard and non-standard sizes.

The parameter "layout" specifies the reading order layout preference where "row" indicates row-oriented reading order and "column" indicates column-oriented reading order. The parameter "allowedAreaTolerance" specifies an extent to which the design elements in the layout can vary from the specified relative areas. For example, an allowable area tolerance value of 0.2 means that a specified relative area for a design element can vary up to 20%. By way of an illustrative example, assuming a relative area of 0.5, an allowable tolerance value of 0.2 means that the relative area can vary from 0.4 to 0.6, thus making the specified relative area value 0.5 an approximate relative area value. The parameters "leftBorder", "rightBorder", "topBorder", and "bottomBorder" specify the left, right, top, and bottom margins of the digital canvas. Similar to the values for the width and height of the digital canvas, the values for the left, right, top, and bottom margins can be in units of pixels. The parameter "horizontalSpacing" specifies the minimum horizontal spacing between any two neighboring design elements in the layout. The parameter "verticalSpacing" specifies the minimum vertical spacing between any two neighboring design elements in the layout. The values for the minimum horizontal spacing and minimum vertical spacing can be in units of pixels.

As can be seen in FIG. 6, the design elements described in the design-elements specification file DesignFileNameA are to be laid out on a digital canvas. The digital canvas on which the digital elements described in the file DesignFileNameA are to be laid out is to have a width of 300 pixels and a height of 250 pixels. The digital canvas is to have a left border of 15 pixels, a right border of 15 pixels, a top border of 30 pixels, and a bottom border of 0 pixels. The layout of the design elements on the digital canvas is to be in row-oriented reading order, and the specified relative area for each design element can vary up to 20%. The minimum horizontal spacing between two neighboring design elements is to be 10 pixels and the minimum vertical spacing between two neighboring design elements is to be 15 pixels. Note that certain parameters can be combined in the layout specification. For example, the parameters "leftBorder" and "rightBorder" can be combined into a single parameter such as "horizontalBorder", and the parameters "topBorder" and "bottomBorder" can be combined into a single parameter such as "verticalBorder". It will further be appreciated that a default value can be provided for a parameter in cases where the parameter is not included in the layout specification or a value is not provided for a parameter in the layout specification.

Methodology

Figure 7:
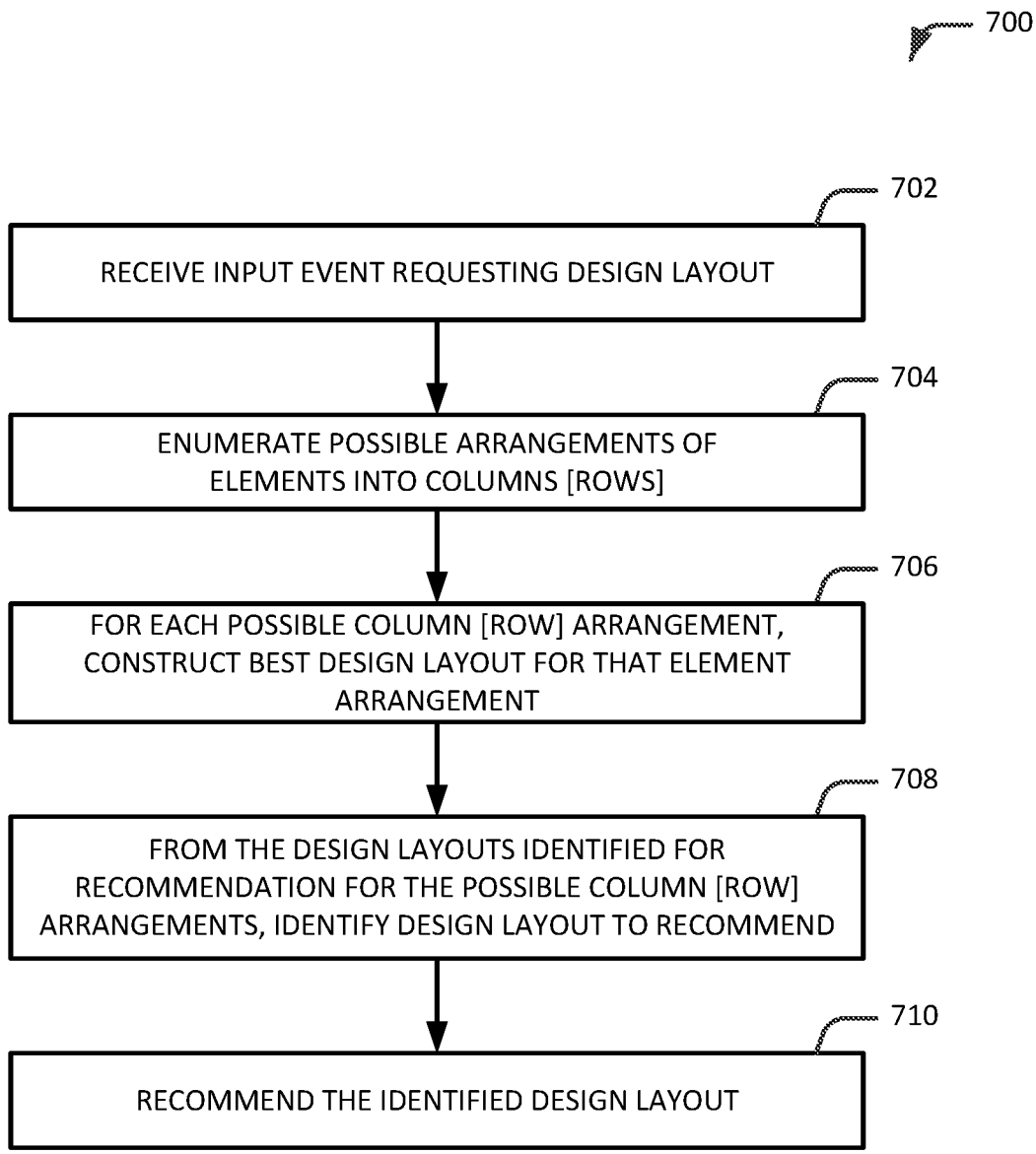
FIG. 7 is a flow diagram illustrating an example process for recommending a design layout, in accordance with an embodiment of the present disclosure.

FIG. 7 is a flow diagram illustrating an example process 700 for recommending a design layout, in accordance with an embodiment of the present disclosure. The operations, functions, or actions illustrated in example process 700 and example processes 900 and 1000 further described below may in some embodiments be performed by various components of design layout application 312 of FIG. 3. The operations, functions, or actions described in the respective blocks of example process 700 and example processes 900 and 1000 may also be stored as computer-executable instructions in a computer-readable medium, such as memory 306 and/or data store 310 of computing system 302 of FIG. 3.

As will be further appreciated in light of this disclosure, for this and other processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

With reference to example process 700 of FIG. 7, at 702, design layout application 312 can receive an input event requesting a design layout. By way of an example use case, a user, such as a layout designer, may generate a design-elements specification file and a layout specification file. The user can then utilize UI 314, or other suitable method, to input or otherwise provide the design-elements specification file and the layout specification file, and request a design layout recommendation based on the provided inputs. In this example use case, the user may have specified in the layout specification file that the design elements described in the design-elements specification file are to be laid out in column-oriented reading order. As such, the description in processes 700, 900, and 1000 are directed to laying out design elements in column-oriented reading order. However, it will be appreciated in light of this disclosure that the corresponding processes for laying out design elements in row-oriented reading order can be understood to be substantially analogous to processes 700, 900, and 1000. For instance, the corresponding processes for laying out design elements in row-oriented reading order can be generated by replacing "horizontal" with "vertical", "column" with "row", "width" with "height", "widest" with "tallest", etc., in processes 700, 900, and 1200, and this disclosure should not be construed as limited in this regard.

At 704, column/row enumeration module 316 enumerates some if not all of the possible arrangements of the design elements into columns [rows]. Continuing the above example use case, the enumerated arrangements are the possible layouts of the design elements in column-oriented reading order. In general, for n design elements, there are $2^{n-1}$ possible arrangements of the n design elements. By way of an illustrative example, in the case of five design elements, there will be 16 possible arrangements ($2^{5-1}$) as follows:

|  |  |
|---|---|
| [0 1 2 3 4] | [0] [1 2 3 4] |
| [0 1 2 3] [4] | [0] [1 2 3] [4] |
| [0 1 2] [3 4] | [0] [1 2] [3 4] |
| [0 1 2] [3] [4] | [0] [1 2] [3] [4] |
| [0 1] [2 3 4] | [0] [1] [2 3 4] |
| [0 1] [2 3] [4] | [0] [1] [2 3] [4] |
| [0 1] [2] [3 4] | [0] [1] [2] [3 4] |
| [0 1] [2] [3] [4] | [0] [1] [2] [3] [4] |

In the above example, [0] [1 2] [3 4] is a 3-column arrangement with design element 0 in the first column, design elements 1 and 2 in the second column, and design elements 3 and 4 in the third column. [0 1 2 3 4] is a 1-column arrangement having all five design elements in the single column, and [0] [1] [2] [3] [4] is a 5-column arrangement where each design element is in its own column.

Figure 8:
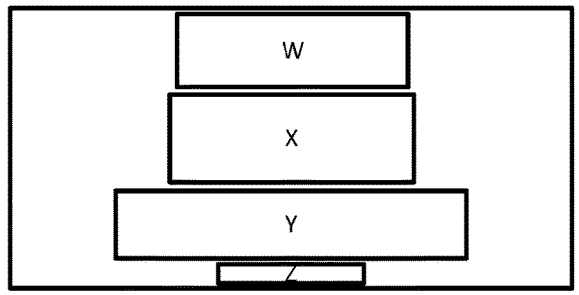
FIG. 8 illustrates an example set of possible arrangements of four design elements into columns, in accordance with an embodiment of the present disclosure.
Figure 8:
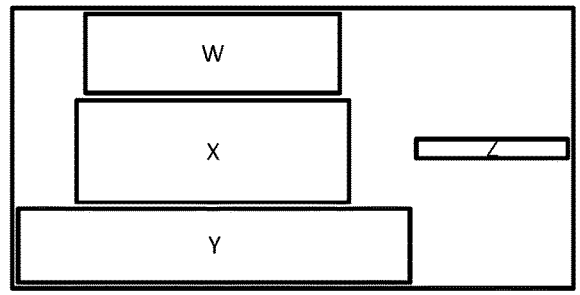
Figure 8:
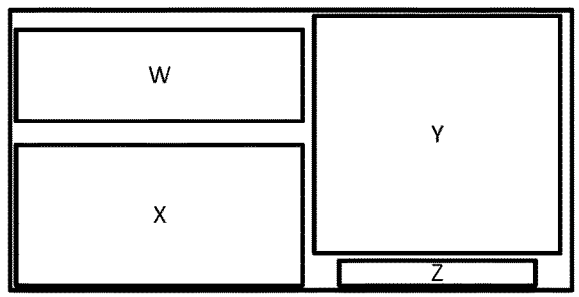
Figure 8:
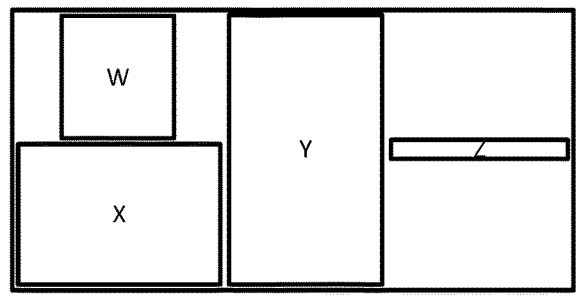
Figure 8:
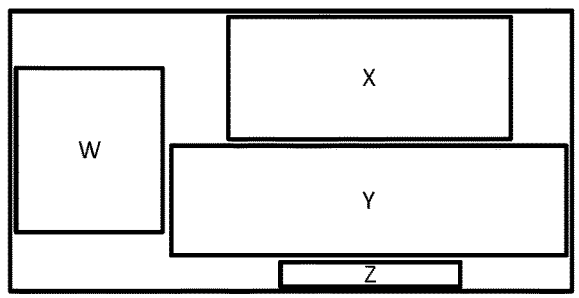
Figure 8:
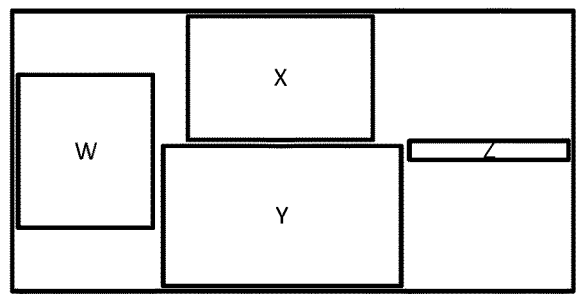
Figure 8:
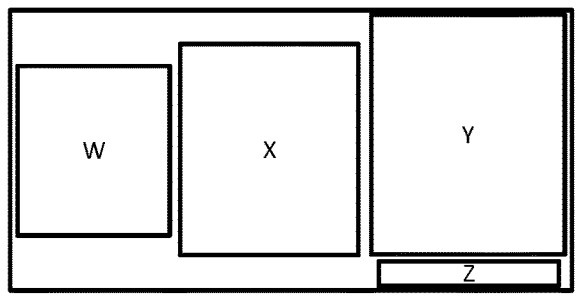
Figure 8:
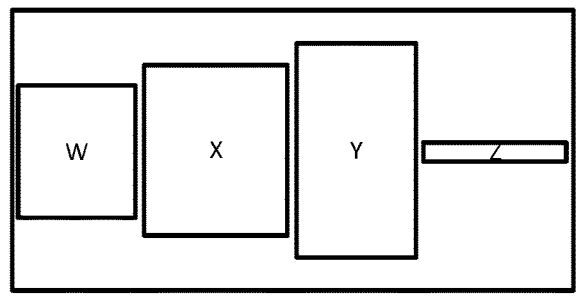

FIG. 8 illustrates an example set of possible arrangements of four design elements into columns, in accordance with an embodiment of the present disclosure. As shown, there are eight ($2^{4-1}$) possible arrangements of the 4 design elements W, X, Y, and Z. Arrangement [W X Y Z] is a 1-column arrangement with design elements W, X, Y, and Z laid out in the single column; arrangement [W X Y] [Z] is a 2-column arrangement with design elements W, X, and Y laid out in a first column and design element Z laid out in a second column; arrangement [W X] [Y Z] is a 2-column arrangement with design elements W and X laid out in a first column and design elements Y and Z laid out in a second column; arrangement [W] [X Y Z] is a 2-column arrangement with design element W laid out in a first column and design elements X, Y, and Z laid out in a second column; arrangement [W X] [Y] [Z] is a 3-column arrangement with design elements W and X laid out in a first column, design element Y laid out in a second column, and design element Z laid out in a third column; arrangement [W] [X Y] [Z] is a 3-column arrangement with design element W laid out in a first column, design elements X and Y laid out in a second column, and design element Z laid out in a third column; arrangement [W] [X] [Y Z] is a 3-column arrangement with design element W laid out in a first column, design element X laid out in a second column, and design elements Y and Z laid out in a third column; and arrangement [W] [X] [Y] [Z] is a 4-column arrangement with design elements W, X, Y, and Z each laid out in its own column.

Figure 9:
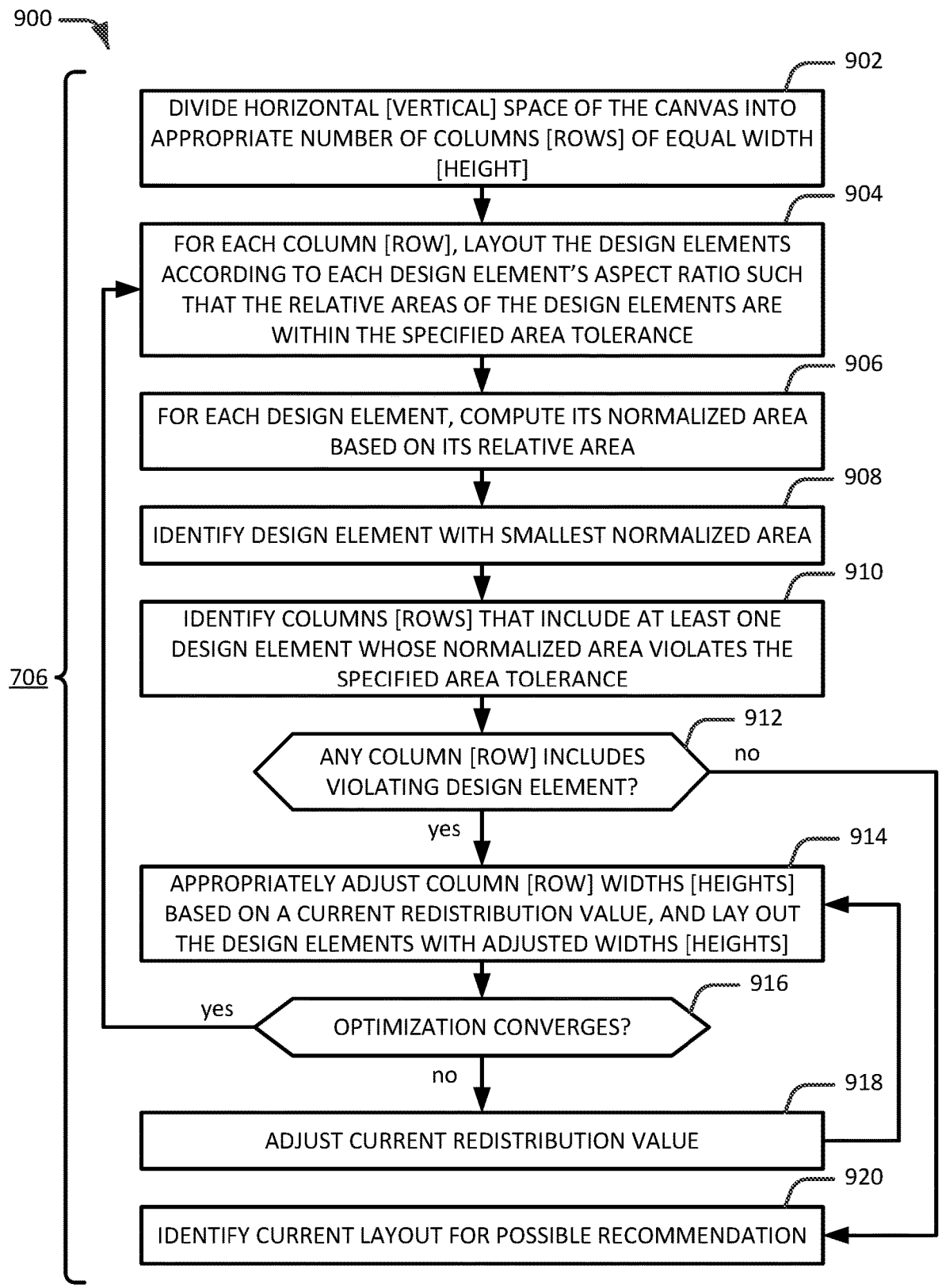
FIG. 9 is a flow diagram illustrating an example process to generate a layout of design elements having a column [or row] oriented reading order, in accordance with an embodiment of the present disclosure.

Referring again to process 700 of FIG. 7, at 706, for each possible column [row] arrangement, element layout module 318 constructs the best possible layout of the design elements for that arrangement. For instance and referring to the example arrangement of design elements W, X, Y, and Z in FIG. 8, element layout module 318 constructs the best possible layout of design elements W, X, Y, and Z for each of the eight possible arrangements [W X Y Z], [W X Y] [Z], [W X] [Y Z], [W] [X Y Z], [W X] [Y] [Z], [W] [X Y] [Z], [W] [X] [Y Z], and [W] [X] [Y] [Z]. In one specific embodiment, element layout module 318 lays out the design elements in each column [row] such that the design elements are center-aligned in the column [row]. In other embodiments, element layout module 318 can lay out the design elements in each column [row] such that the design elements are aligned with the left [top] margin, the right [bottom] margin, half way between the center and the left [top] margin, half way between the center and the right [bottom] margin, a pre-established distance from the center to the left [top] margin, a pre-established distance from the center to the right [bottom] margin, or any combination thereof. In one embodiment, the best layout of the design elements may be the layout having the least amount of unused space. In another embodiment, the best layout of the design elements may be the layout having the highest number of design elements that are within a given tolerance of or otherwise sufficiently close to a specified target aspect ratio, as previously explained. In other embodiments, the best layout of the design elements may be the layout having design elements that are not too square, too tall, too wide, or any other undesired shape, or any other desired preference. FIG. 9 provides further details of the design element layout construction at 706, according to some embodiments.

FIG. 9 is a flow diagram illustrating an example process 900 to generate a layout of design elements for a column [row], in accordance with an embodiment of the present disclosure. In one such embodiment, at 902 and 904, an initial layout of the design elements is generated with all the columns [rows] having the same width [height]. From this initial layout, at 906-920, a layout optimization process that adjusts the column widths [row heights] and lays out the design elements in the columns [rows] with the adjusted widths [heights] is iterated until a layout having all the design elements within the specified area tolerance of the relative areas is generated.

Figure 10:
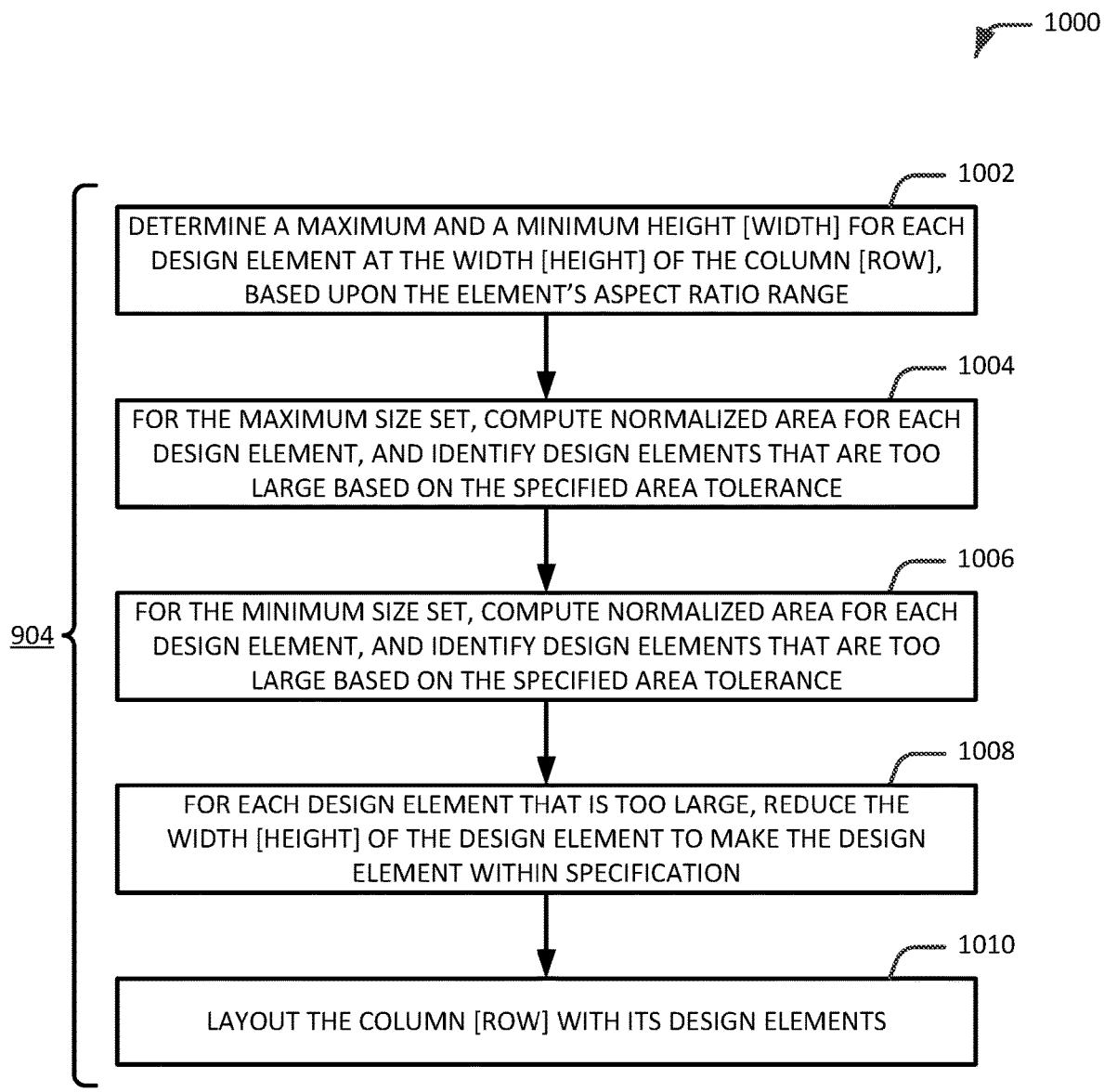
FIG. 10 is a flow diagram illustrating an example process to layout design elements in a column [or row] oriented reading order, in accordance with an embodiment of the present disclosure.

In more detail, at 902, element layout module 318 divides the horizontal [vertical] space of the canvas into an appropriate number of columns [rows] of equal width [height]. The size of the canvas can be determined from the values of the width and height parameters in the layout specification. The appropriate number of columns [rows] correspond to the current column [row] arrangement that is being processed. At 904, for each column [row], element layout module 318 lays out the design elements according to each design element's aspect ratio such that the relative areas of the design elements in the column [row] are within the specified area tolerance. FIG. 10 provides further details of the process to lay out design elements in a column [row] at 904, according to some embodiments. Note that element layout module 318 performs the process in FIG. 10 for each column [row] in the canvas. Also note that each column [row] is laid out independent of the layouts of the other columns [rows].

FIG. 10 is a flow diagram illustrating an example process 1000 to layout design elements in a column [row], in accordance with an embodiment of the present disclosure. At 1002, element layout module 318 computes a maximum height [width] and a minimum height [width] for each design element to be laid out in the column [row] at the current width [height] of the column [row], based on the specific design element's aspect ratio range. The aspect ratio range can be determined from the aspect ratio specified for the design element in the design-elements specification file. For example, in the case of a single fixed aspect ratio value such as 1.5, the aspect ratio range is from the single aspect ratio value (e.g., 1.5) to the single aspect ratio value (e.g., 1.5). In the case of a list of allowable aspect ratio values, such as 1.0, 1.3, and 1.5, the aspect ratio range is from the smallest allowable aspect ratio value (e.g., 1.0) to the largest allowable aspect ratio value (e.g., 1.5). In the case of a variable range of allowable aspect ratio values, such as 1.8 to 3.5, the aspect ratio range is from the smallest aspect ratio value in the variable range (e.g., 1.8) to the largest aspect ratio value in the variable range (e.g., 3.5). Note that the maximum height of a design element occurs at the minimum aspect ratio, and the minimum height of a design element occurs at the maximum aspect ratio.

At 1004, element layout module 318 computes a normalized area for each design element in the maximum size set. The maximum size set includes the design elements at the maximum height [width]. For example, if the area of a design element is 3,000 and the relative area specified for the design element is 0.75, the normalized area for the design element can be computed as 3,000÷0.75=4,000. Having computed the normalized areas for the design elements in the maximum size set, element layout module 318 identifies the design elements that are too large based on the specified area tolerance. The area tolerance can be determined from the allowed area tolerance parameter value in the layout specification.

At 1006, element layout module 318 computes a normalized area for each design element in the minimum size set. The minimum size set includes the design elements at the minimum height [width]. Having computed the normalized areas for the design elements in the minimum size set, element layout module 318 identifies the design elements that are too large based on the specified area tolerance.

At 1008, element layout module 318 reduces the width [height] of each design element identified as being too large to bring the design element within specification. The specification can include the aspect ratio, the relative area, and the allowed area tolerance. Reducing the width [height] of a design element causes a proportional reduction in the height [width] of the design element based on the design element's aspect ratio, which causes the design element to become smaller. At 1010, element layout module 318 lays out the column [row] with its design elements.

In some example embodiments, element layout module 318 may optimize the layout of the design elements in the column [row]. In a first example case, it may be that, even at their maximum heights [widths], the total or combined height [width] of the design elements does not use or consume the column's [row's] full height [width]. In such cases, element layout module 318 can appropriately space the design elements in the column [row] at the maximum heights [widths] of the design elements. For example, the design elements may be evenly spaced apart from one another in the column [row]. In a second example case, it may be that, even at their minimum heights [widths], the total or combined height [width] of the design elements is still too tall [wide] for the column [row]. In such cases, element layout module 318 can scale the design elements down uniformly at the minimum sizes of the design elements until the total or combined height [width] of the design elements fits within the column [row]. In a third example case, it may be that the design elements consume the column's [row's] full height [width] somewhere between the maximum and minimum heights [widths] of the design elements. In such cases, element layout module 318 can generate an initial layout of the column [row] with each design element at a height [width] between its minimum and maximum height [width], such that the total or combined height [width] of the design elements uses or consumes the full column height [row width]. In one embodiment, element layout module 318 can then further optimize the design elements by identifying design elements that are too large and decreasing the size of each such design element without violating its size constraints (e.g., aspect ratio, relative area, and relative area tolerance), and identifying design elements that are too small and increasing the size of each such design element without violating its size constraints. In one implementation, a design element can be deemed too large or too small based on a normalized area computed for the design element. Note that a design element that is too large can be made smaller by making the design element shorter or by making the design element narrower. In one such example embodiment, element layout module 318 decreases the size of a design element that is too large by first making the design element shorter and, when the design element has reached its minimum height for the width, making the design element narrower.

Referring again to process 900 of FIG. 9, at 906, element layout module 318 computes a normalized area for each design element based on its relative area. For example, if the area of a design element is 2,000 and the relative area specified for the design element is 0.7, the normalized area for the design element can be computed as 2,000÷0.7=approximately 2,857. At 908, element layout module 318 identifies the design element with the smallest normalized area. At 910, element layout module 318 identifies the columns [rows] that include at least one design element whose normalized area is outside or otherwise violates the specified area tolerance. Note that the column [row] that includes the smallest design element cannot include such a design element whose normalized area violates its specified area tolerance. This is because the column [row] layout guarantees that the design elements in each column [row] are within the specified tolerance.

At 912, element layout module 318 checks to determine whether any column [row] is identified as including a design element whose normalized area is outside or otherwise violates the specified area tolerance. If it is determined that no column [row] includes such a design element, then, at 920, element layout module 318 identifies the current layout of the design elements for possible recommendation. Here, the identified layout of the design elements can be considered the best design layout for the column [row] arrangement that is being processed.

Otherwise, if it is determined that one or more columns [rows] includes at least one design element whose normalized area is outside or otherwise violates the specified area tolerance, then, at 914, element layout module 318 adjusts the column widths [row heights] to make all the columns [rows] that include design elements that are too large (e.g., violate the specified area tolerance) narrower [shorter], and all columns [rows] that do not include such design elements wider [taller]. In one implementation, the adjustment can be based on a redistribution value. The redistribution value can be initialized to a suitable value, such as 15%, 20%, 25%, or any other suitable value. The redistribution value may be tunable based on a desired performance. In some example cases, the redistribution value may be specified by a user. Additionally or alternatively, the redistribution value can be set by design layout application 312. In any such cases, the amount of space to redistribute can start out relatively large (e.g., 20% of the width [height]) and is evenly redistributed among the appropriate columns [rows]. By way of an illustrative example, assuming three columns of respective widths 100, 200, and 300, a current redistribution value of 24%, and the third column of width 300 is to be made narrower, the redistribution space of 72 (e.g., 300×24%) is evenly redistributed such that 36 (e.g., 72÷2) is redistributed to the first column having the width 100 and 36 (e.g., 72÷2) is applied to the second column having the width 200. Thus, the result of this example case is that the width of the first column is widened to 136, the width of the second column is widened to 236, and the width of the third column is narrowed to 228. By way of another illustrative example, assuming four columns of respective widths 100, 200, 300, and 400, a current redistribution value of 20%, and the second and third columns of widths 200 and 300 are to be made narrower, the redistribution space of 100 (e.g., 500× 20%) is evenly redistributed such that 50 (e.g., 100÷2) is redistributed to the first column having the width 100 and 50 (e.g., 100÷2) is applied to the fourth column having the width 400. Thus, the result of this example case is that the width of the first column is widened to 150, the width of the second column is narrowed to 160, the width of the third column is narrowed to 240, and the width of the fourth column is widened to 450.

At 916, element layout module 318 checks to determine whether the optimization of the layout resulting from operations 904-914 converges. For example, if the new set of column widths [row heights] are the same as a previous set of column widths [row heights], then the optimization of the layout may not be converging. As an illustrative example, consider the case of two columns, a first column and a second column. This this example case, making the first column wider and the second column narrower might shift the first column having the too-large design element to the second column. Then, on the next or succeeding optimization iteration, the first column will again have the too-large design element and the second column will no longer have the too-large design element.

If it is determined that the optimization of the layout is not converging, then, at 918, element layout module 318 adjusts the current redistribution value. In one implementation, the redistribution value can be reduced by a factor of 50% (e.g., current redistribution value÷2) or by any other suitable factor. Process 900 then returns to 914 where element layout module 318 adjusts the column widths [row heights] to make all the columns [rows] that include design elements that are too large (e.g., violate the specified area tolerance) narrower [shorter] and all columns that do not include such design elements wider [taller] based on the adjusted redistribution value.

Otherwise, if it is determined that the optimization of the layout is converging, then process 900 returns to 904, where element layout module 318 generates a new layout of the elements in each column [row] with the adjusted widths [heights]. Element layout module 318 iterates the layout optimization (operations 904-918) until all the design elements in all the columns [rows] are within specification (e.g., within specified area tolerance).

Figure 11:
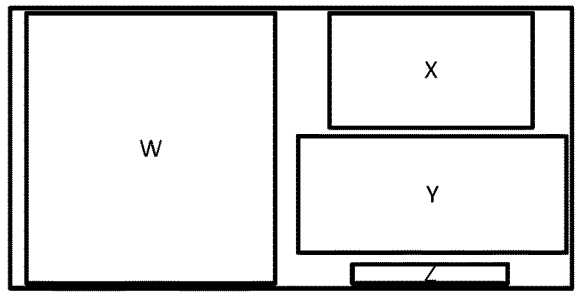
FIG. 11 is a diagram showing example layouts of design elements generated during multiple layout optimization iterations, in accordance with an embodiment of the present disclosure.
Figure 11:
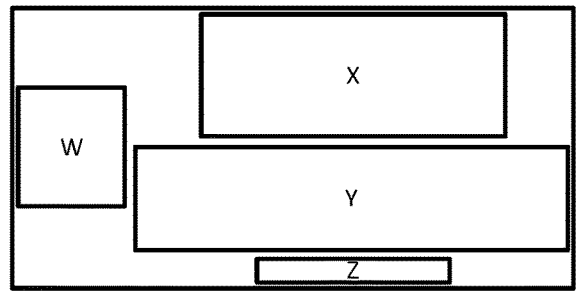
Figure 11:
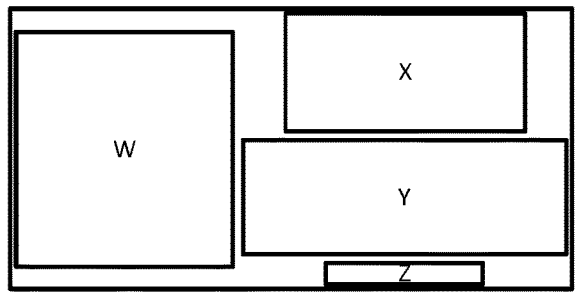
Figure 11:
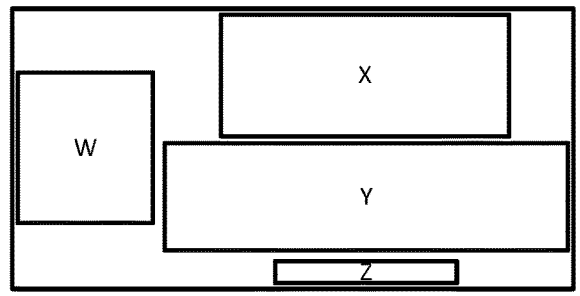
Figure 11:
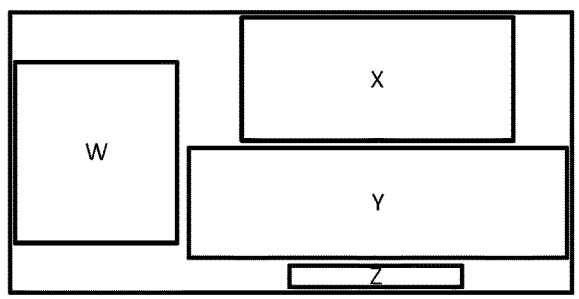
Figure 11:
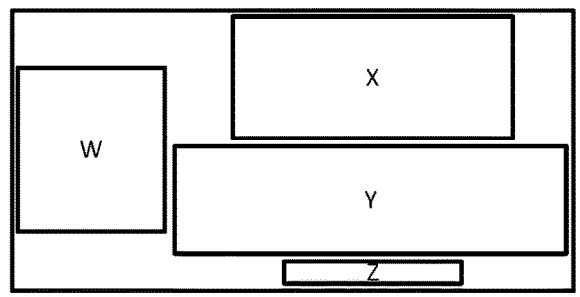

FIG. 11 is a diagram showing example layouts of design elements generated during multiple layout optimization iterations, in accordance with an embodiment of the present disclosure. In particular, the illustrated optimization iterations are for a 2-column arrangement [W] [X Y Z] of FIG. 8. As explained above, in this arrangement, design element W is laid out in a first column and design elements X, Y, and Z are laid out in a second column. Iteration 1 shows the layout of the design elements in two equal-sized columns. In the resulting layout at iteration 1, it may be that, while design elements X, Y, and Z in the second column have acceptable areas relative to each other, design element W in the first column is too large relative to the areas of design elements X, Y, and Z. The result is that design element W is too big and design elements X, Y, and Z are too small. Iteration 2 shows the layout of the design elements in the two columns with adjusted widths, where the width of the first column is narrowed, and the width of the second column is widened. In the resulting layout at iteration 2, it may still be that, while design elements X, Y, and Z in the second column have acceptable areas relative to each other, design element W in the first column is still too large relative to the areas of design elements X, Y, and Z. Iteration 3 shows the layout of the design elements in the two columns with adjusted widths, where the width of the first column is again narrowed, and the width of the second column is again widened. In the resulting layout at iteration 3, it may still be that, while design elements X, Y, and Z in the second column have acceptable areas relative to each other, design element W in the first column is still too large relative to the areas of design elements X, Y, and Z. Iteration 4 shows the layout of the design elements in the two columns with adjusted widths, where the width of the first column is yet again narrowed, and the width of the second column is yet again widened. In the resulting layout at iteration 4, it may be that design element W in the first column is now too small relative to the areas of design elements X, Y, and Z. Here, the optimization is no longer converging in the sense that the width of the first column has now become too small (e.g., overshot the size optimization). Thus, the first column now needs to be larger (widened), but not to the extent of the first column at iteration 3. In one implementation, the first column is widened to a width that is between its current width and the width at the last iteration in which the first column was too large (e.g., iteration 3). In one such example implementation, the first column is widened such that the new width of the first column is halfway between the width at iteration 3 and iteration 4. Iteration 5 shows the layout of the design elements in the two columns with adjusted widths, where the width of the first column is now widened, and the width of the second column is now narrowed. In the resulting layout at iteration 5, it may still be that design element W in the first column is still too small relative to the areas of design elements X, Y, and Z. Thus, the first column still needs to be larger (widened), but not to the extent of the first column at iteration 3. Iteration 6 shows the layout of the design elements in the two columns with adjusted widths, where the width of the first column is again widened, and the width of the second column is again narrowed. Here, the first column may have been widened by a smaller amount than the amount widened in going from iteration 4 to iteration 5. In the resulting layout at iteration 6, it may be the case that all the design elements are within specification (e.g., have acceptable relative areas). Thus, the layout of the design elements at iteration 6 can be identified for possible recommendation.

In some embodiments, element layout module 318 can exit the layout optimization iteration upon exceeding a threshold number of optimization iterations without obtaining an acceptable layout of the design elements (e.g., a layout in which all the design elements are within specification). The optimization iteration threshold may be set to a suitable value, such as 45, 50, 55, or any other suitable value. The optimization iteration threshold may be tunable based on a desired performance. In some example cases, the optimization iteration threshold may be specified by a user. Additionally or alternatively, the optimization iteration threshold can be set by design layout application 312. In some such embodiments, for a particular arrangement of design elements in which the threshold number of optimization iterations is exceeded without obtaining an acceptable layout, element layout module 318 can identify the final imperfect layout of the design elements for that particular arrangement for possible recommendation. Alternatively, for a particular arrangement of design elements in which the threshold number of optimization iterations is exceeded without obtaining an acceptable layout, element layout module 318 may not identify any layout of the design elements for that particular arrangement for recommendation.

Referring again to process 700 of FIG. 7, at 708, design layout application 312 identifies a design layout to recommend from the layouts of the design elements identified for possible recommendation for the column [row] arrangements. As described previously, design layout application 312 may identify the design layout based on some selection criteria. In some embodiments, design layout application 312 can rank layouts of the design elements identified for possible recommendation for the column [row] arrangements. In such embodiments, design layout application 312 can identify one or more design layouts to recommend based on the ranking of the layouts. At 710, design layout application 312 can recommend the identified design layout or design layouts. For example, referring again to the example use case of 702, design layout application 312 can recommend one or more design layouts to the user using UI 314 such that the user can cause the display any of the one or more recommended design layouts, for instance. Continuing this example case, the user can then use a recommended layout of the design elements to generate a desired design layout.

FURTHER EXAMPLE EMBODIMENTS

The following examples pertain to further embodiments, from which numerous permutations and configurations will be apparent.

Example 1 is a computer program product including one or more non-transitory machine-readable mediums encoding instructions that when executed by one or more processors cause a process to be carried out for recommending a design layout, the process including: receiving a first input, the first input including descriptions of a plurality of design elements, wherein a description of a design element includes an aspect ratio and a relative area; receiving a second input, the second input including a layout preference for the design elements; enumerating a plurality of possible arrangements of the design elements according to the layout preference; constructing one or more layouts of the design elements for each enumerated arrangement of the design elements, the layouts of the design elements being in a reading order based on the layout preference, wherein a layout of the design elements is based on the respective relative areas of the design elements; and recommending at least one layout of the design elements based on selection criteria, wherein the recommended layout of the design elements is usable to generate a design layout.

Example 2 includes the subject matter of Example 1, wherein the layout preference is a column arrangement preference or a row arrangement preference.

Example 3 includes the subject matter of any of Examples 1 and 2, wherein the layout of the design elements is based on the respective relative areas of the design elements and a relative area tolerance.

Example 4 includes the subject matter of any of Examples 1 through 3, wherein the selection criteria includes a preference for a layout having the least amount of unused space.

Example 5 includes the subject matter of any of Examples 1 through 3, wherein the selection criteria includes a preference for a layout having a highest number of design elements that are within a given tolerance of a specified aspect ratio, or otherwise within a specified range of aspect ratios.

Example 6 includes the subject matter of any of Examples 1 through 3, wherein the selection criteria includes a preference for a layout having design elements that are not square, tall, or wide, as measured against an established standard.

Example 7 includes the subject matter of any of Examples 1 through 6, wherein the selection criteria is user-specified.

Example 8 includes the subject matter of any of Examples 1 through 7, wherein constructing the one or more layouts of the design elements comprises, for each enumerated arrangement of the design elements: generating an initial layout of the design elements in equally spaced columns or rows, wherein design elements in each column or row are laid out based on the aspect ratios and relative areas; and iterating a layout optimization process until a layout having all the design elements within specification is generated.

Example 9 includes the subject matter of Example 8, wherein the layout optimization process includes adjusting column widths or row heights, and laying out the design elements in the columns with the adjusted widths or the rows with the adjusted heights.

Example 10 includes the subject matter of Example 9, wherein adjusting the column widths or row heights is based on a redistribution value.

Example 11 includes the subject matter of Example 8, wherein the specification includes a specified area tolerance.

Example 12 is a is a computer implemented method to recommend a design layout, the method including: receiving a first input, the first input including descriptions of a plurality of design elements, wherein a description of a design element includes an aspect ratio and a relative area; receiving a second input, the second input including a layout preference for the design elements, wherein the layout preference is a column-oriented reading order preference or a row-oriented reading order preference; enumerating a plurality of possible arrangements of the design elements into columns or rows based on the layout preference; constructing one or more layouts of the design elements for each enumerated arrangement of the design elements, the layouts of the design elements being in a column-oriented reading order or row-oriented reading order based on the layout preference, wherein a layout of the design elements is based on the respective relative areas of the design elements; and recommending at least one layout of the design elements based on selection criteria, wherein the recommended layout of the design elements is usable to generate a design layout.

Example 13 includes the subject matter of Example 12, wherein the layout of the design elements is based on the respective relative areas of the design elements and a relative area tolerance.

Example 14 includes the subject matter of any of Examples 12 and 13, wherein the selection criteria includes a preference for a layout having the least amount of unused space.

Example 15 includes the subject matter of any of Examples 12 and 13, wherein the selection criteria includes a preference for a layout having a highest number of design elements that are a specified aspect ratio, or otherwise within a specified aspect ratio range.

Example 16 includes the subject matter of any of Examples 12 and 13, wherein the selection criteria includes a preference for a layout having design elements that are not square, tall, or wide, as measured against an established standard.

Example 17 includes the subject matter of any of Examples 12 through 16, wherein the selection criteria is user-specified.

Example 18 includes the subject matter of any of Examples 12 through 17, wherein constructing the one or more layouts of the design elements comprises, for each enumerated arrangement of the design elements: generating an initial layout of the design elements in equally spaced columns or rows, wherein design elements in each column or row are laid out based on the aspect ratios and relative areas; and iterating a layout optimization process until a layout having all the design elements within specification is generated.

Example 19 includes the subject matter of Example 18, wherein the layout optimization process includes adjusting column widths or row heights, and laying out the design elements in the columns with the adjusted widths or the rows with the adjusted heights.

Example 20 includes the subject matter of Example 19, wherein adjusting the column widths or row heights is based on a redistribution value.

Example 21 includes the subject matter of Example 19, wherein the design elements in each column or row are laid out such that the design elements are center aligned.

Example 22 includes the subject matter of Example 19, wherein the design elements in each column are laid out such that the design elements are aligned to a left margin of the column.

Example 23 includes the subject matter of Example 19, wherein the design elements in each column are laid out such that the design elements are aligned to a right margin of the column.

Example 24 includes the subject matter of Example 19, wherein the design elements in each column are laid out such that the design elements are half way between the center and the left margin of the column.

Example 25 includes the subject matter of Example 19, wherein the design elements in each column are laid out such that the design elements are half way between the center and the right margin of the column.

Example 26 includes the subject matter of Example 19, wherein the design elements in each column are laid out such that the design elements are a pre-established distance from the center to the left margin of the column.

Example 27 includes the subject matter of Example 19, wherein the design elements in each column are laid out such that the design elements are a pre-established distance from the center to the right margin of the column.

Example 28 includes the subject matter of Example 19, wherein the design elements in each row are laid out such that the design elements are aligned to a top margin of the row.

Example 29 includes the subject matter of Example 19, wherein the design elements in each row are laid out such that the design elements are aligned to a bottom margin of the row.

Example 30 includes the subject matter of Example 19, wherein the design elements in each row are laid out such that the design elements are half way between the center and the top margin of the row.

Example 31 includes the subject matter of Example 19, wherein the design elements in each row are laid out such that the design elements are half way between the center and the bottom margin of the row.

Example 32 includes the subject matter of Example 19, wherein the design elements in each row are laid out such that the design elements are a pre-established distance from the center to the top margin of the row.

Example 33 includes the subject matter of Example 19, wherein the design elements in each row are laid out such that the design elements are a pre-established distance from the center to the bottom margin of the row.

Example 34 includes the subject matter of Example 18, wherein the specification includes a specified area tolerance.

Example 35 is a system to recommend a design layout. The system includes one or more non-transitory machine-readable mediums configured to store instructions, and one or more processors configured to execute the instructions stored on the one or more non-transitory machine-readable mediums. Execution of the instructions causes the one or more processors to: receive descriptions of a plurality of design elements, wherein a description of a design element includes an aspect ratio and a relative area; receive a layout preference for the design elements, wherein the layout preference is a column-oriented reading order preference or a row-oriented reading order preference; enumerate a plurality of possible arrangements of the design elements into columns or rows based on the layout preference; construct one or more layouts of the design elements for each enumerated arrangement of the design elements, the layouts of the design elements being in a column-oriented reading order or a row-oriented reading order based on the layout preference, wherein a layout of the design elements is based on the respective relative areas of the design elements; and recommend at least one layout of the design elements based on selection criteria, wherein the recommended layout of the design elements is usable to generate a design layout.

Example 36 includes the subject matter of Example 35, wherein the layout of the design elements is based on the respective relative areas of the design elements and a relative area tolerance.

Example 37 includes the subject matter of any of Examples 35 and 36, wherein the selection criteria includes a preference for a layout having the least amount of unused space.

Example 38 includes the subject matter of any of Examples 35 and 36, wherein the selection criteria includes a preference for a layout having a highest number of design elements that are within a given tolerance of a specified aspect ratio, or otherwise within a specified range of aspect ratios.

Example 39 includes the subject matter of any of Examples 35 and 36, wherein the selection criteria includes a preference for a layout having design elements that are not square, tall, or wide, as measured against an established standard.

Example 40 includes the subject matter of any of Examples 35 through 39, wherein the selection criteria is user-specified.

Example 41 includes the subject matter of any of Examples 35 through 40, wherein constructing the one or more layouts of the design elements comprises, for each enumerated arrangement of the design elements: generating an initial layout of the design elements in equally spaced columns or rows, wherein design elements in each column or row are laid out based on the aspect ratios and relative areas; and iterating a layout optimization process until a layout having all the design elements within specification is generated.

Example 42 includes the subject matter of Example 41, wherein the layout optimization process includes adjusting column widths or row heights, and laying out the design elements in the columns with the adjusted widths or the rows with the adjusted heights.

Example 43 includes the subject matter of Example 42, wherein adjusting the column widths or row heights is based on a redistribution value.

Example 44 includes the subject matter of Example 41, wherein the specification includes a specified area tolerance.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer program product including one or more non-transitory machine-readable mediums encoding instructions that when executed by one or more processors cause a process to be carried out for recommending a design layout, the process comprising:

receiving plurality of descriptions, each describing one of a plurality of design elements in terms of an aspect ratio and a relative area measured relative to an area of a particular one of the design elements;

receiving a layout preference for the design elements, wherein the layout preference specifies an area tolerance;

defining an initial arrangement of the design elements into a plurality of content regions, wherein each design element has an area in the initial arrangement;

determining a normalized area for each of the design elements in the initial arrangement, wherein the normalized area corresponds to a ratio of (a) the area of the design element in the initial arrangement to (b) the relative area of the design element;

identifying a design element having a smallest normalized area;

determining a maximum normalized area by increasing the smallest normalized area based on the area tolerance specified in the layout preference;

identifying an oversized design element having a normalized area that is greater than the maximum normalized area;

determining modified dimensions of the content regions by decreasing a dimension of a particular content region that includes the oversized design element and increasing a dimension of one or more content regions other than the particular content region; and identifying a recommended layout of the design elements based on the modified dimensions of the content regions.

2. The computer program product of claim 1, wherein the layout preference further specifies a column arrangement preference or a row arrangement preference.

3. The computer program product of claim 1, wherein the design elements are arranged in equally spaced columns or rows in the initial arrangement.

4. The computer program product of claim 1, wherein the modified dimensions of the content regions are determined based on a user-specified redistribution value.

5. The computer program product of claim 1, wherein the design elements in each content region are center aligned.

6. A computer implemented method to recommend a design layout, the method comprising:

receiving a plurality of descriptions, each describing one of a plurality of design elements in terms of an aspect ratio and a relative area measured relative to an area of a particular one of the design elements;

receiving a layout preference for the design elements, wherein the layout preference specifies an area tolerance;

defining an initial arrangement of the design elements into a plurality of content regions, wherein each design element has an area in the initial arrangement;

determining a normalized area for each of the design elements in the initial arrangement, wherein the normalized area corresponds to a ratio of (a) the area of the design element in the initial arrangement to (b) the relative area of the design element;

identifying a design element having a smallest normalized area;

determining a maximum normalized area by increasing the smallest normalized area based on the area tolerance specified in the layout preference;

identifying an oversized design element having a normalized area that is greater than the maximum normalized area;

determining modified dimensions of the content regions by decreasing a dimension of a particular content region that includes the oversized design element and increasing a dimension of one or more content regions other than the particular content region; and identifying a recommended layout of the design elements based on the modified dimensions of the content regions.

7. The method of claim 6, wherein the layout preference further specifies a column arrangement preference or a row arrangement preference.

8. The method of claim 6, wherein the design elements are arranged in equally spaced columns or rows in the initial arrangement.

9. The method of claim 6, wherein the modified dimensions of the content regions are determined based on a user-specified redistribution value.

10. The method of claim 6, wherein the design elements in each content region are center aligned.

11. A system to recommend a design layout, the system comprising:

one or more non-transitory machine-readable mediums configured to store instructions; and one or more processors configured to execute the instructions stored on the one or more non-transitory machine-readable mediums, wherein execution of the instructions causes the one or more processors to receive a plurality of descriptions, each describing one of a plurality of design elements in terms of an aspect ratio and a relative area measured relative to an area of a particular one of the design elements;

receive a layout preference for the design elements, wherein the layout preference specifies an area tolerance;

define an initial arrangement of the design elements into a plurality of content regions, wherein each design element has an area in the initial arrangement;

determine a normalized area for each of the design elements in the initial arrangement, wherein the normalized area corresponds to a ratio of (a) the area of the design element in the initial arrangement to (b) the relative area of the design element;

identify a design element having a smallest normalized area;

determine a maximum normalized area by increasing the smallest normalized area based on the area tolerance specified in the layout preference;

identify an oversized design element having a normalized area that is greater than the maximum normalized area;

determine modified dimensions of the content regions by decreasing a dimension of a particular content region that includes the oversized design element and increasing a dimension of one or more content regions other than the particular content region; and identify a recommended layout of the design elements based on the modified dimensions of the content regions.

12. The system of claim 11, wherein the design elements are arranged in equally spaced columns or rows in the initial arrangement.

13. The system of claim 11, wherein the layout preference further specifies a column arrangement preference or a row arrangement preference.

14. The system of claim 11, wherein execution of the instructions causes the one or more processors to further:

define an alternative initial arrangement of the design elements into an alternative plurality of content regions, wherein each design element has an alternative area in the alternative initial arrangement;

determine an alternative normalized area for each of the design elements in the alternative initial arrangement, wherein the alternative normalized area corresponds to a ratio of (a) the alternative area of the design element in the alternative initial arrangement to (b) the relative area of the design element;

identify a design element having a smallest alternative normalized area;

determine a maximum alternative normalized area by increasing the smallest alternative normalized area based on the area tolerance specified in the layout preference;

identify an alternative oversized design element having an alternative normalized area that is greater than the maximum alternative normalized area; and determine alternative modified dimensions of the content regions by decreasing a dimension of an alternative particular content region that includes the alternative oversized design element and increasing a dimension of one or more content regions other than the alternative particular content region.

15. The system of claim 14, wherein identifying the recommended layout comprises making a selection between a layout having the modified dimensions and an alternative layout having the alternative modified dimensions.

16. The system of claim 15, wherein the selection is made based on a preference for a layout having a least amount of unused space.

17. The system of claim 15, wherein the selection is made based on a preference for a layout having a highest number of design elements that are within a tolerance of a specified aspect ratio.

18. The system of claim 15, wherein the selection is made based on a preference for a layout having design elements that are not square, tall, or wide, as measured against an established standard.

19. The system of claim 15, wherein the selection is made based on a user-specified selection criterion.

20. The system of claim 11, wherein the modified dimensions of the content regions are determined based on a redistribution value that specifies a percentage by which the dimension of the particular content region is decreased.

* * * * *